UNITED STATES PATENT OFFICE.

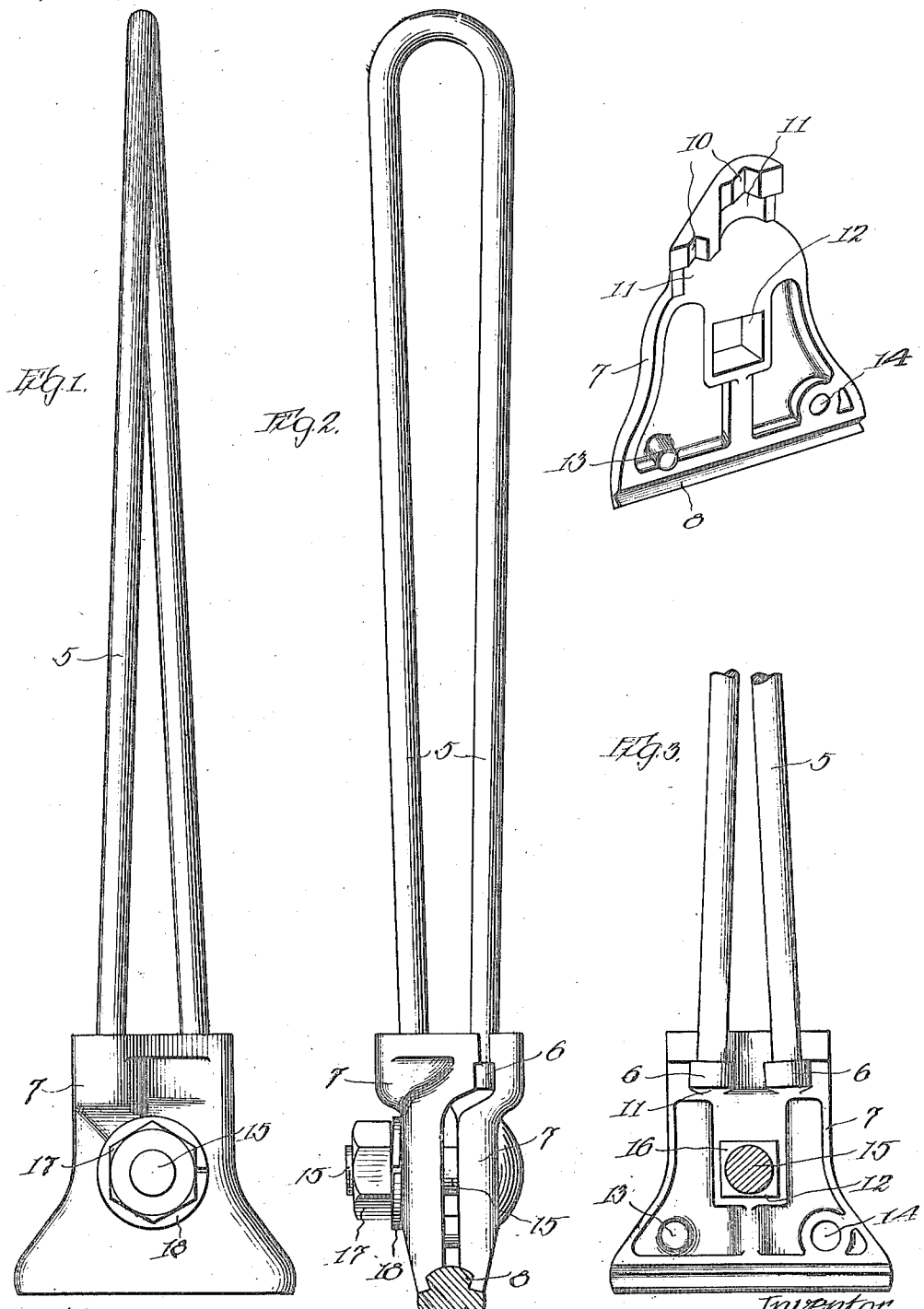

GLENN HENRY BOLUS, OF MANSFIELD, OHIO, ASSIGNOR TO THE OHIO BRASS COMPANY, OF MANSFIELD, OHIO, A CORPORATION OF NEW JERSEY.

CATENARY HANGER.

1,207,483.  Specification of Letters Patent.  Patented Dec. 5, 1916.

Application filed November 10, 1915. Serial No. 60,641.

*To all whom it may concern:*

Be it known that I, GLENN HENRY BOLUS, a citizen of the United States, residing at Mansfield, in the county of Richland and State of Ohio, have invented certain new and useful Improvements in Catenary Hangers, of which the following is a specification.

This invention relates to a hanger for trolley wires in a catenary suspension system, but of course may have a more general application wherever applicable.

The invention consists in the features of novelty in the construction, combination and arrangement of the several parts.

In the drawings, Figure 1 is a side elevation of a hanger constructed in accordance with the principles of my invention; Fig. 2 is an end view; Fig. 3 is a view of one of the clamping members with the extremities of the suspension member in place; and Fig. 4 is a perspective of one of the clamping members.

In a catenary suspension for trolley wires, a trolley wire holder is suspended by means of a suitable supporting member, from a messenger wire, so that the trolley wire is free to rise and fall with respect to the messenger wire, as a trolley wheel or collector passes under the trolley wire. In adjusting the hanger or suspending a trolley wire from a messenger wire, it is important to provide a hanger which may be easily fastened in position both with respect to the trolley wire and the messenger wire.

The present invention relates to a construction in which the suspension member is releasably connected to the trolley wire holder by having extremities which are engaged by the holder between the clamping members, so that by releasing the fastening device which holds the clamping members together, one or both extremities of the suspension member may be disengaged from the holder, allowing the suspension member to be hooked over or unhooked from the messenger wire without actually displacing the wire holder proper or any of its parts, or removing them from their engagement with the trolley wire.

In the drawings, the reference numeral 5 designates generally the suspension member formed of resilient material such as wire, and generally U-shaped in form. The extremities of the suspension member are formed with headed ends 6 and are twisted with respect to each other so that they are not exactly parallel. The trolley wire holder consists of a pair of counterpart clamping members 7 each provided with a jaw 8 for engaging a trolley wire 9 and having angular notches 10 at the upper edge disposed at an angle to the jaw 8, so that the notches 10 are on opposite sides of the jaw 8; that is they are on opposite sides of a vertical plane passing through the jaw and are on a line substantially at 45° with respect to the jaw. Below each of the angular notches 10 is a recess 11 to seat the headed end 6 of the suspension member 5, and the notches 10 are angular in shape so that they will accommodate and center suspension members of different sized wire. Intermediate the top and the bottom of each clamping member 7, is an angular perforation 12, and between this perforation and the clamping jaw 8, is a lug 13 and a depression 14, which coöperate with a counterpart lug and depression of the other clamping member. In order to secure the clamping members 7 together and to hold the headed extremities 6 in engagement with the clamping members, a fastening device consisting of a bolt 15 having a rectangular section 16, is inserted through the perforations 12 and held in place by a nut 17 with a spring washer 18 inserted between it and one of the clamping members 7.

With this construction, it is obvious that the clamping members 7 may be fastened together by the clamping bolt and nut with or without the headed extremities 6 of the suspension member attached to the wire holder. The suspension member may then be attached to the trolley wire holder by loosening the nut on the fastening bolt so that the clamping members 7 may be spread apart and the headed ends 6 inserted without actually disengaging the wire holder from the trolley wire, and without actually separating any of the wire holding parts. By having the extremities of the suspension member twisted with respect to each other, and the engaging notches 10 also disposed at an angle to the clamping jaws, the suspension member 5 may be hooked over the messenger wire so that the trolley wire 9 will be supported directly below and parallel with the messenger wire. If the clamping members 7 were not formed with notches 10 at an angle to the jaws, it would be necessary to give the extremities of the suspension member 5 a half turn so that the upper or curved end of the suspension member would stand properly with respect to the messenger wire. This would bring the lower ends of the suspension member in line with each other, which would prevent the free rising of the hanger with respect to the messenger wire, and if the trolley wire were forced upwardly with sufficient force, it might cause the messenger wire to wedge between the extremities of the suspension member, thereby holding the trolley wire in raised position. At any rate, it would interfere with the free rising and falling of the trolley wire and would not leave a clear space for the messenger wire from the top to the bottom of the suspension member, as shown in Fig. 2. In the present invention this is accomplished by dividing the angle or half turn necessary between the suspension member itself and the trolley wire holder or clamp.

In this invention the extremities of the suspension member are releasably engaged by the upper edges of the trolley wire clamping members, so that the clamping device must be loosened in order to engage or disengage the suspension member. The co-operating lugs and depression 13 and 14 serve to maintain the clamping members in alinement.

What I claim is:

1. In combination, a trolley wire holder; and a freely hung suspension member for said holder having depending extremities with projections at the ends engaged directly by the holder when it is in engagement with the wire.

2. The combination of a trolley wire holder comprising wire clamping members, and a suspension member having depending arms each with a head engaged directly between and by both clamping members.

3. The combination of a trolley wire holder comprising wire clamping members, and a suspension member having depending extremities with heads releasably engaged between the clamping members and insertible and removable therefrom without entirely disengaging the clamping members from their wire engaging position.

4. The combination of a trolley wire holder, comprising wire clamping members, and means for holding them in wire clamping position; and a suspension member having depending extremities each having a head for engagement between the clamping members and insertible and removable therefrom by loosening the holding means without disengaging the members from the wire.

5. The combination of a trolley wire holder comprising wire clamping members, and a fastening bolt and nut for holding the members in wire clamping position; and a suspension member having depending extremities with enlarged ends adapted to be engaged between the clamping members but insertible and removable therefrom by loosening the nut on the bolt and without actually disengaging the nut or displacing the members from wire clamping position.

6. In a catenary wire hanger, the combination of wire holding members, and a suspension member with spaced arms having each of its extremities engaged by and between both holding members and twisted above the holding members to aline the members with a support.

7. In a catenary wire hanger, the combination with a messenger and a trolley wire, of trolley wire holding members, and a suspension member freely movable with respect to the messenger wire having both extremities engaged by and between the holding members and twisted above the holding members to support the trolley wire in the same plane as the messenger wire.

8. In a catenary wire hanger, the combination with a messenger and a trolley wire, of a trolley wire holder having wire clamping jaws and other engaging portions at an angle to the jaws, and a suspension member having extremities adapted to be held by the said engaging portions and supported by the messenger wire.

9. In a catenary wire hanger, the combination with a messenger and a trolley wire, of a trolley wire holder having wire clamping jaws and other engaging portions at an angle to the jaws, and a suspension member having extremities adapted to be held by the said engaging portions and twisted above the trolley wire holder so that the trolley wire is supported directly below and is free to move in the plane of the messenger wire.

10. In a catenary wire hanger, the combination with a messenger wire and a trolley wire, of a trolley wire clamp comprising a pair of members each having a wire gripping jaw and engaging notches at an angle to the jaw, a supporting member adapted to be hooked over a messenger wire having headed extremities twisted with respect to each other and engageable in the notches, and a fastening device to hold the wire clamp and the supporting member together.

11. In a catenary wire hanger, the combination with a trolley wire clamp comprising a pair of members each having a wire gripping jaw and engaging notches at the end of the member opposite the gripping jaw, a suspension member having headed extremities spaced apart and held in said notches, and means to releasably bind the wire clamping members together and the extremities of the suspension member in the notches between them.

12. In a catenary wire hanger, the combination with a trolley wire clamp comprising a pair of members each having a wire engaging jaw, wire engaging notches at an angle to the jaw, and an intermediate lug and depression, a suspension member having extremities engaged by the said notches, and means to clamp the pair of members together in engagement with a wire and to bind the extremities of the suspension member releasably between the pair of members from whence they may be released without displacing the other parts.

In testimony whereof I have signed my name to this specification, in the presence of two subscribing witnesses, on this 6" day of Nov., A. D. 1915.

GLENN HENRY BOLUS.

Witnesses:
D. S. PORCH,
H. M. SEIBERT.